US012556459B2

(12) United States Patent
Ray

(10) Patent No.: US 12,556,459 B2
(45) Date of Patent: Feb. 17, 2026

(54) SYNTHESIZING ALLOCATIONS FOR MICROSERVICES IN MULTI-ACCESS EDGE COMPUTING

(71) Applicant: INTERNATIONAL BUSINESS MACHINES CORPORATION, Armonk, NY (US)

(72) Inventor: Kaustabha Ray, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 18/768,598

(22) Filed: Jul. 10, 2024

(65) Prior Publication Data

US 2026/0019343 A1 Jan. 15, 2026

(51) Int. Cl.

*H04L 41/16* (2022.01)
*H04L 41/0823* (2022.01)
*H04L 41/0895* (2022.01)

(52) U.S. Cl.

CPC .......... *H04L 41/16* (2013.01); *H04L 41/0823* (2013.01); *H04L 41/0895* (2022.05)

(58) Field of Classification Search

CPC .. H04L 41/16; H04L 41/0823; H04L 41/0895
See application file for complete search history.

(56) References Cited

U.S. PATENT DOCUMENTS 10,917,316 B2 2/2021 Parthasarathy et al.
2022/0044110 A1* 2/2022 Ryu .................... G06N 3/0464
2022/0100184 A1* 3/2022 Natarajan ................. G06F 9/50
2024/0364584 A1* 10/2024 Ray ..................... H04L 43/0817
2024/0419503 A1* 12/2024 Ray ..................... G06F 9/44526
2024/0419526 A1* 12/2024 Ray ..................... G06F 11/0709
2025/0068540 A1* 2/2025 Ray ..................... G06F 11/3024
2025/0267089 A1* 8/2025 Ray ......................... H04L 43/50
2025/0272159 A1* 8/2025 Ray ....................... G06F 9/5083

OTHER PUBLICATIONS

A. Radovanovic, et al., "Carbon-Aware Computing for Datacenters." IEEE Transactions on Power Systems, vol. 38, No. 2, Mar. 2023, 11 pp.

B. Acun, et al., "Carbon Explorer: A Holistic Framework for Designing Carbon Aware Datacenters." arXiv:2201.10036v3, Feb. 22, 2023, 15 pp.

C.T. Joseph, et al. "Fuzzy Reinforcement Learning based Microservice Allocation in Cloud Computing Environments," IEEE, Dec. 12, 2019, 5 pp.

(Continued)

*Primary Examiner* — Philip C Lee

(74) *Attorney, Agent, or Firm* — KONRAD, RAYNES, DAVDA & VICTOR LLP; Rabindranath Dutta

(57) ABSTRACT

A plurality of edge computing nodes are provided in a multi-access edge computing environment. Operations are performed to ensure that energy consumption of edge computing nodes is minimized and a latency of serving requests is lower than a threshold by overapproximating or underapproximating parameter bounds or budgets; and by using reinforcement learning discrete actions to determine whether to overapproximate or underapproximate in an integer linear programming (ILP) solution.

20 Claims, 8 Drawing Sheets

(56) References Cited

OTHER PUBLICATIONS

G. Premsankar, et al. "Energy-Efficient Service Placement for Latency-Sensitive Applications in Edge Computing," IEEE, IEEE Internet of Things Journal, vol. 9, No. 18, Sep. 2022, 12 pp.
K. Ray, "Policy Design And Verification For Multi-Access Edge Computing: A Formal Methods Perspective," IEEE, IEEE Journals & Magazine, Feb. 2022, 250 pp. divided into Part 1, 2 and 3.
K. Ray, et al. "Learning-Based Microservice Placement and Migration for Multi-Access Edge Computing," IEEE, Dec. 19, 2019, 3 pp.
M. Ashraf, et al. "Microservice Application Scheduling in Multi-Tiered Fog-Computing-Enabled IoT," MDPI, sensors, Aug. 12, 2023, 15 pp.
M. Liu, et al., "E3: Energy-Efficient Microservices on SmartNIC-Accelerated Servers," USENIX, Jul. 10, 2019, 16 pp.
P. Wiesner, et al., "Let's Wait Awhile: How Temporal Workload Shifting Can Reduce Carbon Emissions in the Cloud." ACM, 2021, 13 pp.
T. Bahreini, et al., "An Approximation Algorithm for Minimizing the Cloud Carbon Footprint through Workload Scheduling." IEEE, 2022 IEEE 15th International Conference on Cloud Computing (CLOUD), 2022, 10 pp.
T. Yang, et al., "Carbon Management of Multi-Datacenter Based on Spatio-Temporal Task Migration." IEEE Transactions on Cloud Computing, vol. 11, No. 1, Jan.-Mar. 2023, 13 pp.
V.M. Bhasi, et al., "Kraken: Adaptive container provisioning for deploying dynamic dags in serverless platforms." ACM, Proceedings of the ACM Symposium on Cloud Computing, 2021, 14 pp.

* cited by examiner

| | NGINX | Search | Make_Post | Read_Timeline | Follow | Text | Media | User_Tag | URL | Compose_Post | Post_Storage | end |
|---|---|---|---|---|---|---|---|---|---|---|---|---|
| NGINX | 0 | 0 | 0 | 0 | 0 | 0 | 0 | 0 | 0 | 0 | 0 | 0 |
| Search | 0.08 | 0 | 0 | 0 | 0 | 0 | 0 | 0 | 0 | 0 | 0 | 0 |
| Make_Post | 0.4 | 0 | 0 | 0 | 0 | 0 | 0 | 0 | 0 | 0 | 0 | 0 |
| Read_Timeline | 0.32 | 0 | 0 | 0 | 0 | 0 | 0 | 0 | 0 | 0 | 0 | 0 |
| Follow | 0.2 | 0 | 0 | 0 | 0 | 0 | 0 | 0 | 0 | 0 | 0 | 0 |
| Text | 0 | 0 | 0.5 | 0 | 0 | 0 | 0 | 0 | 0 | 0 | 0 | 0 |
| Media | 0 | 0 | 0.3 | 0 | 0 | 0 | 0 | 0 | 0 | 0 | 0 | 0 |
| User_Tag | 0 | 0 | 0.1 | 0 | 0 | 0 | 0 | 0 | 0 | 0 | 0 | 0 |
| URL | 0 | 0 | 0.1 | 0 | 0 | 0 | 0 | 0 | 0 | 0 | 0 | 0 |
| Compose_Post | 0 | 0 | 0 | 0 | 0 | 1 | 1 | 1 | 1 | 0 | 0 | 0 |
| Post_Storage | 0 | 0 | 0 | 0 | 0 | 0 | 0 | 0 | 0 | 1 | 0 | 0 |
| end | 0 | 1 | 0 | 0 | 1 | 0 | 0 | 0 | 0 | 0 | 1 | 0 |

600

Exemplary embodiment

602 — 1. Formulate Optimal Solution as Integer Linear Programming (ILP) – NP Hard 604 — 2. RL agent for an application decides Overapproximation / Underapproximation (discrete space RL)
Overapproximate the <E, L> parameters
Overapproximate $E \pm \partial$ and $L \pm \in$
RL agent to select $\partial$ and $\in$ values
(continuous space RL)

606 — 3. Objective function – weight by probability of a microservice invocation 608 — 4. Solve ILP by relaxing to LP (polynomial time) and randomized rounding 610 — 5. If infeasible then Assign Rewards to the RL agent as 0
Else assign rewards equal to values of Energy and Latency obtained from the solution 612 — 6. Update rewards according to Q-Learning Reinforcement Learning 614 — $Q(s,a) = 1 - \alpha Q(s,a) + \alpha(Reward + \gamma Q(s',a))$

FIG. 6

SYNTHESIZING ALLOCATIONS FOR MICROSERVICES IN MULTI-ACCESS EDGE COMPUTING

BACKGROUND

Embodiments relate to a method, system, and computer program product for synthesizing allocations for microservices in Multi-Access Edge Computing.

Multi-Access Edge Computing (MEC) is used as an application service provisioning paradigm for low-latency access to services in a cellular telephony network. In MEC paradigms, service providers deploy their application services on MEC servers that may be adjacent to mobile base stations. Computationally intensive operations from Internet-of-Things (IoT) devices may be directed to nearby MEC servers as the IoT devices move around, in order to reduce latency in comparison to accessing services located at traditional cloud data centers.

A microservice architecture is an architectural style that structures an application as a collection of services that are independently deployable and are loosely coupled.

Integer Linear Programming (ILP) is a type of optimization problem where the variables are integer values and the objective function and equations are linear.

Q-learning is a model-free reinforcement learning mechanism to learn the value of an action in a particular state. Q-learning does not require a model of the environment (hence it is model-free), and such mechanisms may handle problems with stochastic transitions and rewards without requiring adaptations.

SUMMARY

Provided are a method, system, and computer program product in which a plurality of edge computing nodes are provided in a multi-access edge computing environment. Operations are performed to ensure that energy consumption of edge computing nodes is minimized and a latency of serving requests is lower than a threshold by overapproximating or underapproximating parameter bounds or budgets; and using reinforcement learning discrete actions to determine whether to overapproximate or underapproximate in an integer linear programming (ILP) solution.

In additional embodiments, reinforcement learning continuous actions are used to determine an amount of overapproximation or underapproximation.

In yet additional embodiments, a reinforcement learning agent is used to assign rewards and to assign zero rewards for infeasible solutions.

In certain embodiments, a directed acyclic graphic is used to represent an order of invocation of microservices in a microservice-based application.

In further embodiments, each microservice has a latency requirement, wherein probability distributions for microservice invocations are maintained in a matrix for performing computations, and wherein an objective function is weighted by probability of a microservice invocation.

In certain embodiments, given a power budget and the latency, a server and dynamic voltage frequency scale (DVFS) allocation for each microservice is determined.

In additional embodiments, the ILP is solved by relaxing to linear programming (LP).

BRIEF DESCRIPTION OF THE DRAWINGS

Referring now to the drawings in which like reference numbers represent corresponding parts throughout:

FIG. 6 illustrates a block diagram that shows mechanisms to solve the allocation problem for power consumption and latency optimization, in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide mechanisms for synthesizing allocations for microservices in multi-access edge computing. Operations are performed to ensure that energy consumption of edge nodes are minimized and the latency for serving requests is kept low (e.g., below a predetermined threshold) by performing at least the following:

(1) Overapproximating or underapproximating parameter bounds or budgets for energy and latency.

(2) Using reinforcement learning discrete actions to determine whether to overapproximate or underapproximate parameter bounds or budgets to an integer linear programming (ILP) solution.

(3) Using reinforcement learning continuous actions to determine the amount of overapproximation or underapproximation.

(4) Using reinforcement learning agent rewards to assign zero rewards for infeasible solutions and positive rewards for feasible solutions.

As a result of certain embodiments, improvements are made in a multi-access edge computing environment to optimize energy consumption and latency.

Figure 1:
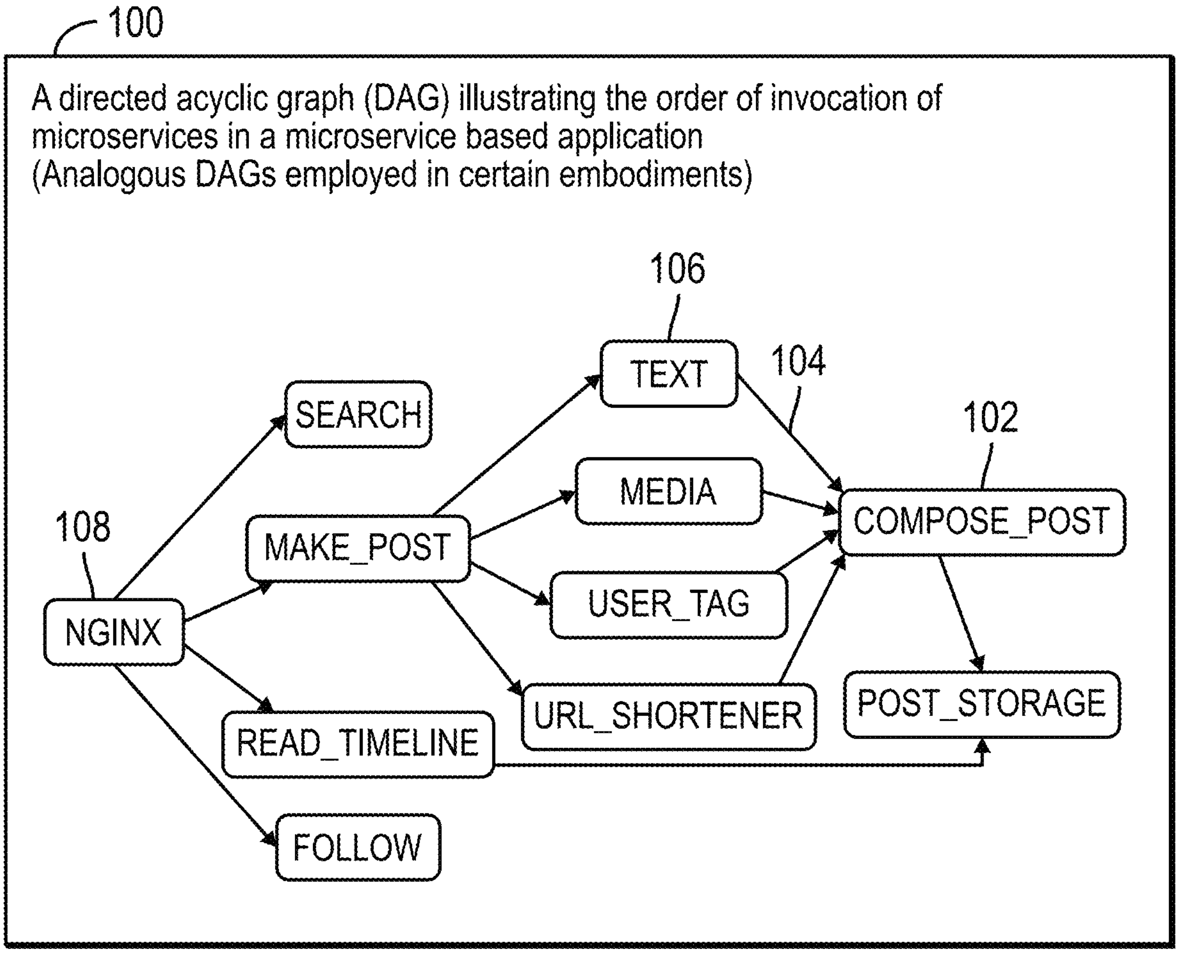
FIG. 1 illustrates a block diagram of a microservice based application, in accordance with certain embodiments.

FIG. 1 illustrates a block diagram 100 that shows a directed acyclic graph (DAG) that depicts the order of invocation of microservices in a microservice-based application, where such and analogous DAGs may be employed in certain embodiments. In certain embodiments, FIG. 1 may show a microservice based application for a social network.

In certain embodiments a microservice-based application is executed by being decomposed into microservices. For example, in FIG. 1, each of the boxes is a microservice that represents a function. For example, the box labeled 102 is a microservice that represents a compose post function. Arrows show the order or invocation of the microservices. For example, arrow 104 indicates that a text microservice 106 may be followed by the compose post function 102.

The structure of the microservices of a microservice-based application forms a directed acyclic graph (DAG). In FIG. 1, the DAG begins with the microservice NGINX 108 from which other microservices are invoked.

Figure 2:
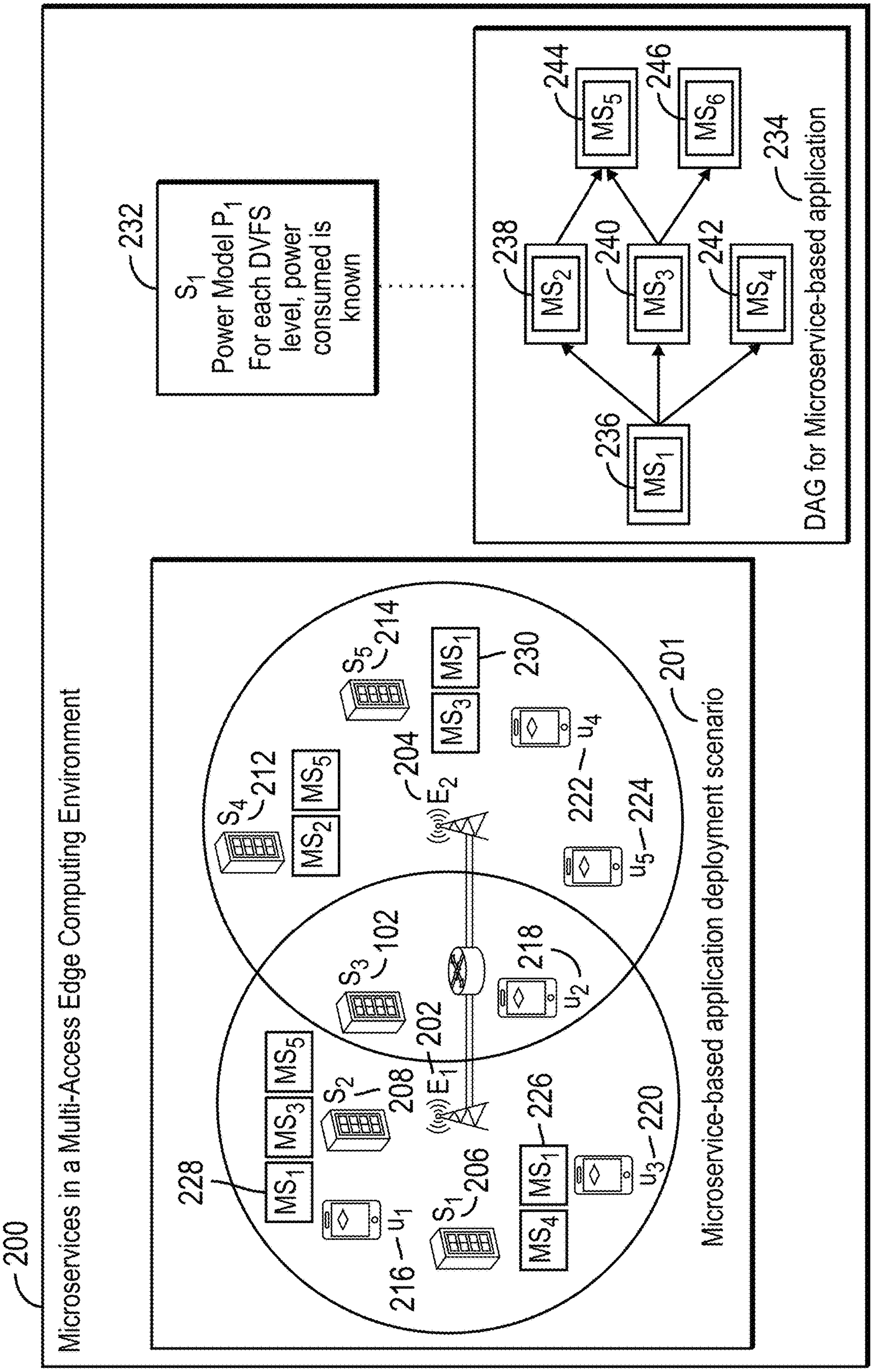
FIG. 2 illustrates a block diagram of microservices in multi-access edge computing, in accordance with certain embodiments.

FIG. 2 illustrates a block diagram 200 of microservices in multi-access edge computing environment, in accordance with certain embodiments.

A microservice-based application deployment scenario 201 is shown in FIG. 2. Multiple edge sites comprising a first edge site $E_1$ 202 and a second edge site $E_2$ 204 are shown. An edge site is comprised of a plurality of servers, where the servers are also referred to as edge servers or edge computing nodes. For example, the first edge site $E_1$ 202 is comprised of three servers $S_1$, $S_2$, $S_3$ (shown via reference numerals 206, 208, 210) and the second edge site $E_2$ 104 is comprised of a server $S_4$ and a server $S_5$ (shown via reference numerals 212, 214). The devices $U_1$, $U_2$, $U_3$, $U_4$, $U_5$ (reference numerals 216, 218, 220, 222, 224) may comprise user equipment such as mobile phones that request services deployed on the edge servers $S_1$, $S_2$, $S_3$, $S_4$, $S_5$ (reference numerals 206, 208, 210, 212, 214).

Microservices may be deployed on the edge servers $S_1$, $S_2$, $S_3$, $S_4$, $S_5$ (reference numerals 206, 208, 210, 212, 214). It may be noted that a microservice may be deployed on one or more edge servers. For example, FIG. 1 shows via reference numerals 226, 228, 230 that microservice $MS_1$ is deployed on edge servers $S_1$, $S_2$, $S_3$ (shown via reference numerals 206, 208, 210).

For each edge server there is a power model associated with the edge server. For example, reference numeral 232 shows that for edge server $S_1$ there is an associated power model $P_1$. A dynamic voltage frequency scale (DVFS) represents the power levels consumed at an edge server, where the DVFS scale encompasses a plurality of DVFS levels. For each DVFS level, the power consumed by an edge server is known.

In FIG. 2, a DAG corresponding to a microservice based application 234 is shown. From microservice $MS_1$ three microservices $MS_2$, $MS_3$, $MS_4$ are initiated (as shown via reference numerals 236, 238, 240, 242), and subsequently additional microservices $MS_5$, $MS_6$ are initiated (as shown via reference numerals 244, 246).

In certain embodiments, servers in FIG. 2 may comprise any suitable computational device including those presently known in the art, such as, a personal computer, a workstation, a mainframe, a hand-held computer, a palm top computer, a head-mounted computer, a telephony device, a network appliance, a blade computer, a processing device, a controller, etc. The elements shown in FIG. 2 may be in any suitable network, such as, a storage area network, a wide area network, the Internet, an intranet, etc., or in a cloud computing environment.

Figure 3:
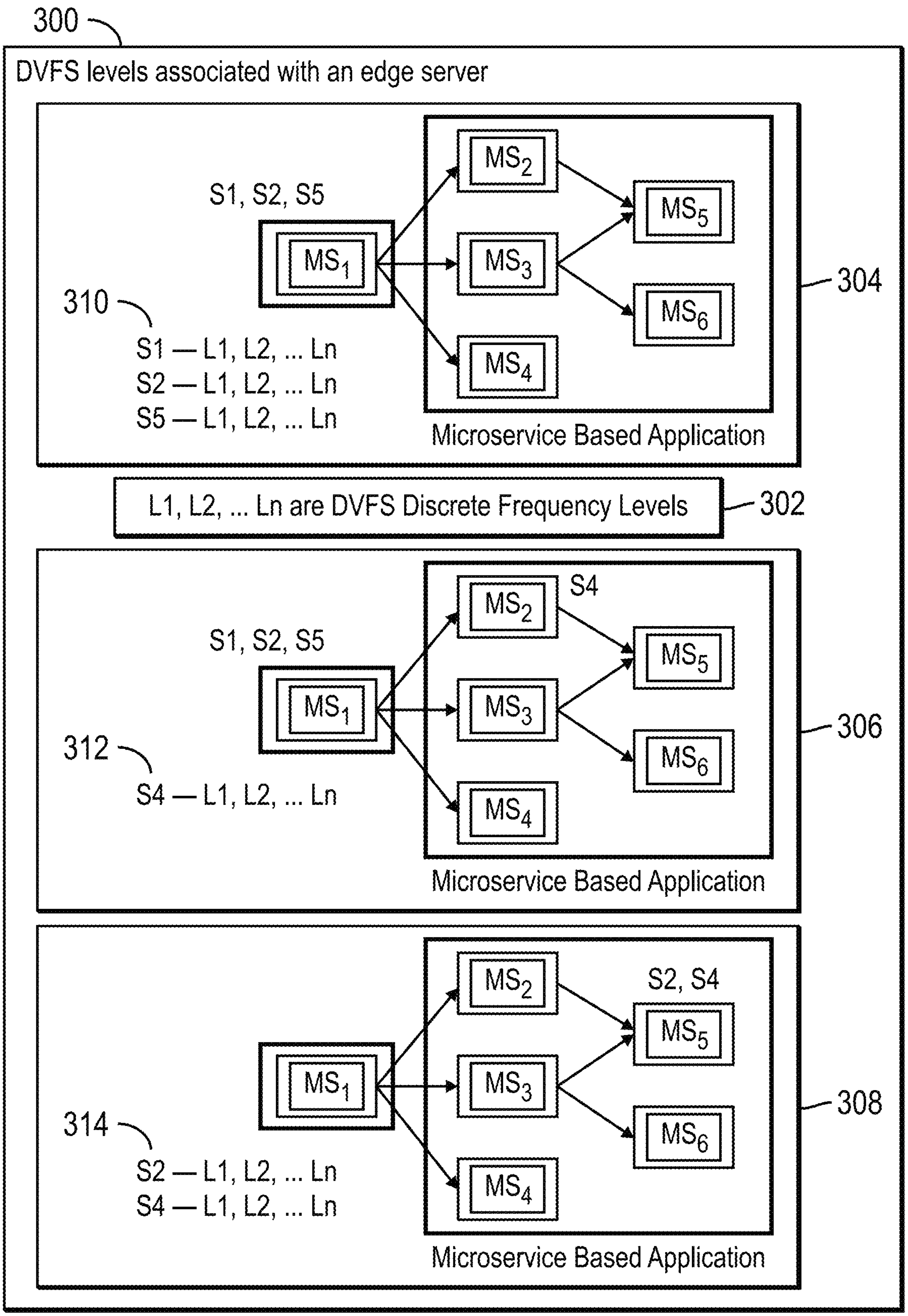
FIG. 3 illustrates a block diagram that shows dynamic voltage frequency scale (DVFS) levels associated with a server, in accordance with certain embodiments.

FIG. 3 illustrates block diagram 300 that shows DVFS levels associated with an edge server, in accordance with certain embodiments. L1, L3, . . . . Ln are DVFS discrete frequency levels associated with an edge server (as shown via legend 302).

Block 304 shows that microservice $MS_1$ is deployed on edge servers $S_1$, $S_2$, $S_5$ and the possible DVFS levels on each of the edge servers $S_1$, $S_2$, $S_5$ are shown via reference numeral 310.

Block 306 shows that microservice $MS_2$ is deployed on edge server $S_4$ and the DVFS levels on the edge server $S_4$ are shown via reference numeral 312.

Block 308 shows that microservice $MS_5$ is deployed on edge servers $S_2$, $S_4$ and the DVFS levels on each of the edge servers $S_2$, $S_4$ are shown via reference numeral 314.

The energy consumption associated with a microservice may be computed from the DVFS levels.

Figure 4:
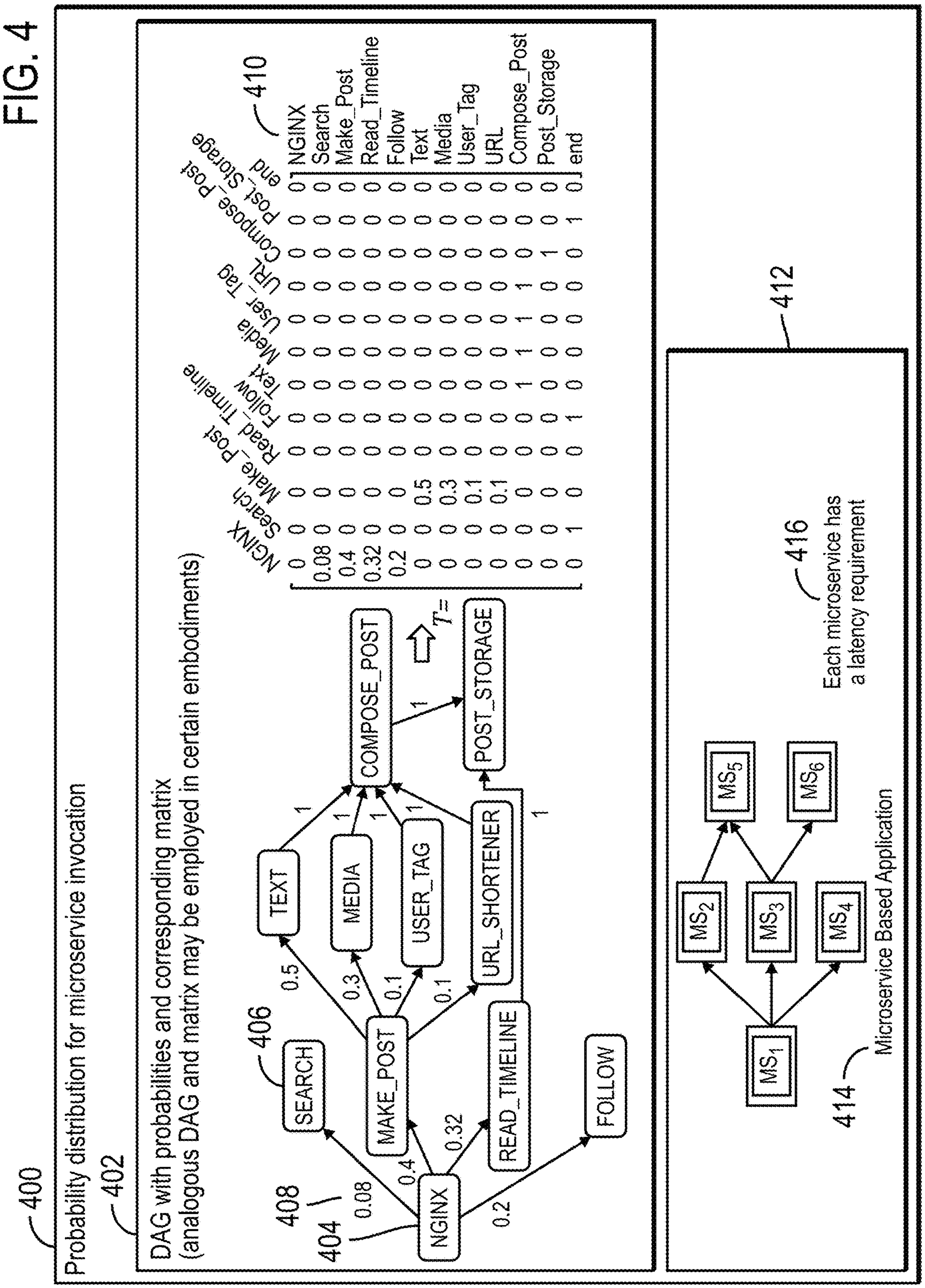
FIG. 4 illustrates a block diagram that shows the probability distribution for microservice invocation, in accordance with certain embodiments.

FIG. 4 illustrates a block diagram 400 that shows the probability distribution for microservice invocation, in accordance with certain embodiments.

Block 402 shows that in a DAG starting with NGINX 404, the probability of a successor microservice Search 406 being invoked is 0.8 (as shown via reference numeral 408). The probabilities of a successor microservice invocation in a DAG may be represented in a matrix 410. DAGs analogous to the DAG shown in block 402 and corresponding matrices analogous to the matrix 410 may be employed in certain embodiments.

In FIG. 4, block 412 shows the DAG of a microservice based application 414 where each microservice has a latency requirement (as shown via reference numeral 416).

Figure 5:
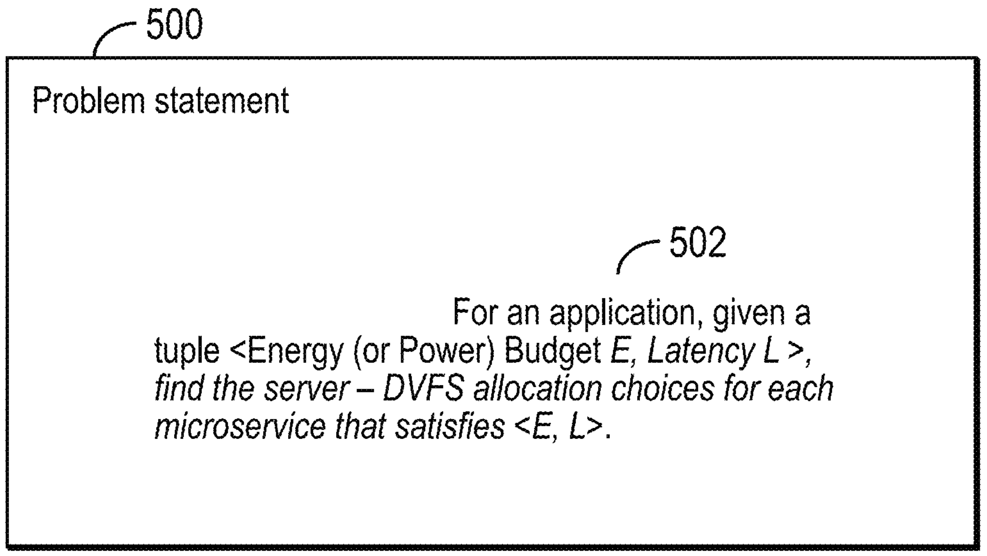
FIG. 5 illustrates a block diagram of a problem statement for a problem addressed via certain mechanisms, in accordance with certain embodiments.

FIG. 5 illustrates a block diagram 500 of a problem statement for optimizing energy consumption and latency, in accordance with certain embodiments.

In certain embodiments, there is a microservice-based application with an energy budget and a latency budget associated with it. The problem is to determine which edge server to allocate a particular microservice to, as well as the DVFS level this microservice should run at so that the energy budget is satisfied.

In certain embodiments, the problem to be addressed is as follows: For an application, given a tuple <Energy (or Power) Budget E, Latency L>, find the server—DVFS allocation choices for each microservice that satisfies <E, L> (as shown via reference numeral 502).

Which particular microservice to allocate to a server to satisfy the energy budget as well as maintain latency is a problem that is addressed by certain embodiments. However, energy budgets are defined for a long-term period (e.g., for a month) and not for a short interval of time (e.g., seconds). For example, while an energy budget may be defined for a day, a week, or a month, there may be no energy budget that is defined for a second or a minute, In certain embodiments, latency may be indicated for a short term or over a long term. For example, latency may be indicated for a short term, or for a long term such as for a month (i.e., wherein for a short term, the latency budget may refer to the individual computation latencies of the microservices whereas for an extended period of time the latency budget may refer to the aggregate latency perceived when executing the application). Other parameters besides energy and latency may be used in alternative embodiments. In certain embodiments, the solution entails short instantaneous based approximations for energy and latency.

Certain embodiments take the long run values of the energy and latency and define them approximately over an instantaneous amount of time (e.g., a minute). For example, the energy budget may be given as 6000 joules for a 10-hour (i.e., 600 minute) period, and this may be defined over an instantaneous period of time (such as approximately 1 minute) to be 10 joules.

There are problems in which an optimal solution to determine the server-DVFS allocation for each microservice that satisfies <E,L> is formulated as an integer linear programming (ILP) based solution. The ILP problem is NP-Hard and therefore polynomial time solutions may not be feasible.

There may be situations where <E,L> cannot be satisfied under any scenario. Even verifying the feasibility of solution existence is also an NP-hard problem, and no polynomial time algorithms may be available for this purpose.

In certain embodiments energy and latency are defined approximately over instantaneous values. Overapproximation and Underapproximation and reinforcement learning are used for solutions to determine the server-DVFS allocation for each microservice that satisfies <E,L>.

FIG. 6 illustrates a block diagram 600 that shows mechanisms to solve the allocation problem for power consumption and latency optimization, in accordance with certain embodiments.

Certain embodiments first formulate a solution to determine the server-DVFS allocation for each microservice that satisfies <E,L> as an ILP (shown via reference numeral 602). Any ILP based approach may be used.

Since, energy budget is defined for a long time period, and latency for either long or short time periods, certain embodiments provide an approximation of the energy and latency budgets over short term durations to use the ILP based approach and yet solve the problem in polynomial time.

For example, for a month interval, there is an energy budget for the entire month. Certain embodiments discretize the timespan of the entire month into short intervals, such as 10-minute intervals.

For example, consider that the energy budget is 6000 joules for an entire duration of 10 hours (i.e., 600 minutes) that has been divided into sixty 10-minute slots which means that 100 joules is the budget for each 10-minute slot. It is possible that the energy budget is not satisfied in some slots during the process of determining a solution and certain embodiments address this via overapproximation and underapproximation.

In certain embodiments, reinforcement learning (RL) is used to learn how to divide into slots that need not be equal. A reinforcement Learning (RL) agent for an application decides the overapproximation and underapproximation. For example, certain embodiments overapproximate the <E, L> parameters. For example, certain embodiments overapproximate $E\pm\partial$ and $L\pm\epsilon$ for each of the slots, where the RL agent is used to select $\partial$ and $\epsilon$ values (continuous space RL) [as shown via reference numeral 604]. Overapproximation is performed to increase the energy budget and underapproximation is performed to underapproximate the energy budget. The RL agent selects the delta and epsilon values.

In certain embodiments, the objective function in ILP is weighted by the probability of the microservice invocation (as shown via reference numeral 606). The ILP is solved by relaxing to Linear Programming (LP) which is solvable in polynomial time and randomized rounding [as shown via reference numeral 608]. This relaxation technique transforms an NP-hard optimization problem (integer linear programming) into a related problem that is solvable in polynomial time (linear programming); the solution to the relaxed linear program can be used to gain information about the solution to the original integer linear program.

If the solution is infeasible then certain embodiments assign rewards to the RL agent as 0 (i.e., wrong decision made). Otherwise, embodiments assign rewards equal to values of energy and latency obtained from the solution [as shown via reference numeral 610].

The rewards are updated (shown via reference numeral 612) according to Q-Learning Reinforcement Learning as shown via the Q-learning equation 614 in FIG. 6 and the process continues. Q-learning is a machine learning approach that enables a model to iteratively learn and improve over time by taking the correct action. Q-learning is a type of reinforcement learning.

Embodiments that employ the Q-learning equation 614 shown in FIG. 6 uses the rewards to iteratively optimize the solution. Alpha is the learning rate and gamma is a discount factor in the Q-learning equation 614. The quality (Q) of state(s) action (a) interactions are iteratively determined via the Q-learning equation 614 to arrive at the solution.

Figure 7:
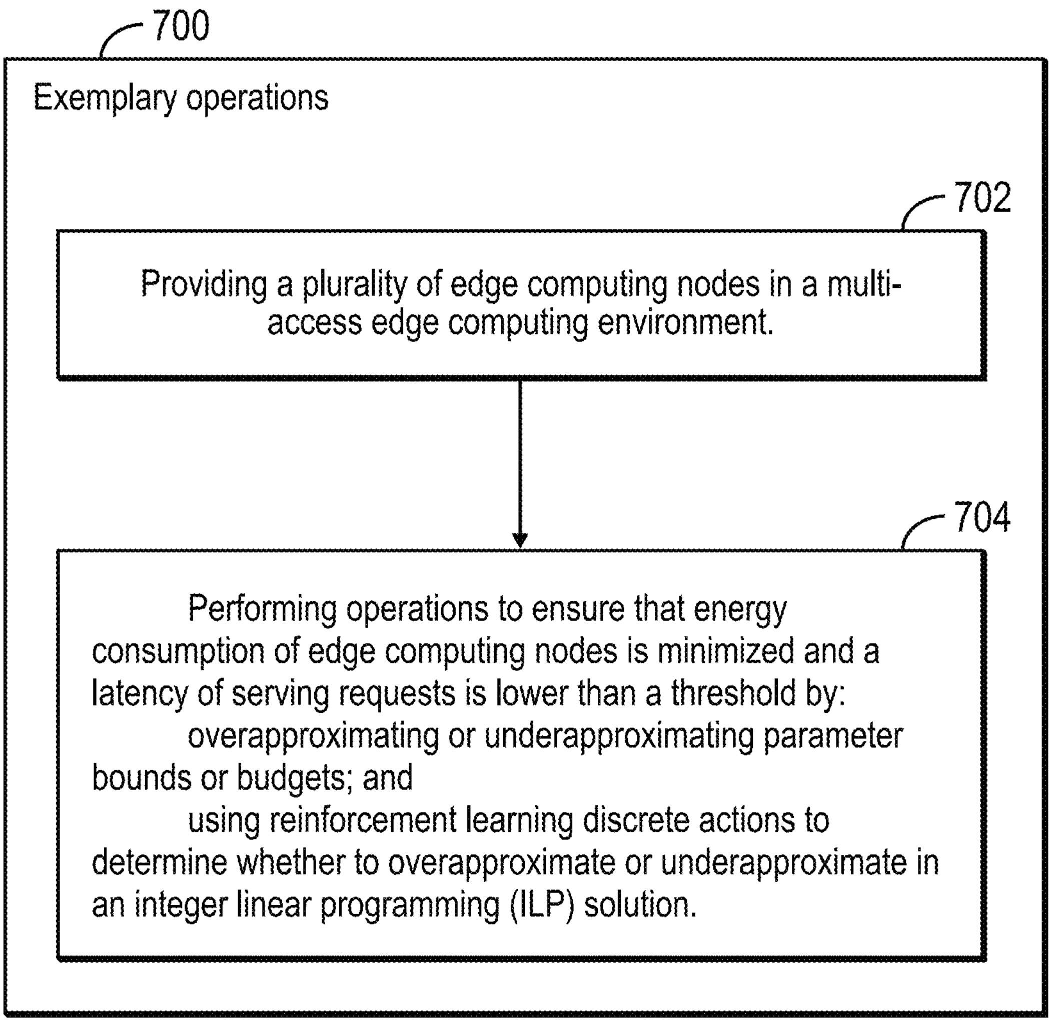
FIG. 7 illustrates a flowchart that shows exemplary operations, in accordance with certain embodiments.

FIG. 7 illustrates a flowchart 700 that shows exemplary operations, in accordance with certain embodiments.

Control starts at block 702 in which a plurality of edge computing nodes are provided in a multi-access edge computing environment. Operations are performed (at block 704) to ensure that energy consumption of edge computing nodes is minimized and a latency of serving requests is lower than a threshold by overapproximating or underapproximating parameter bounds or budgets; and by using reinforcement learning discrete actions to determine whether to overapproximate or underapproximate in an integer linear programming (ILP) solution.

Therefore, FIGS. 1-7 illustrate embodiments for recommendation of synthesizing allocations for microservices in multi-access edge computing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 8:
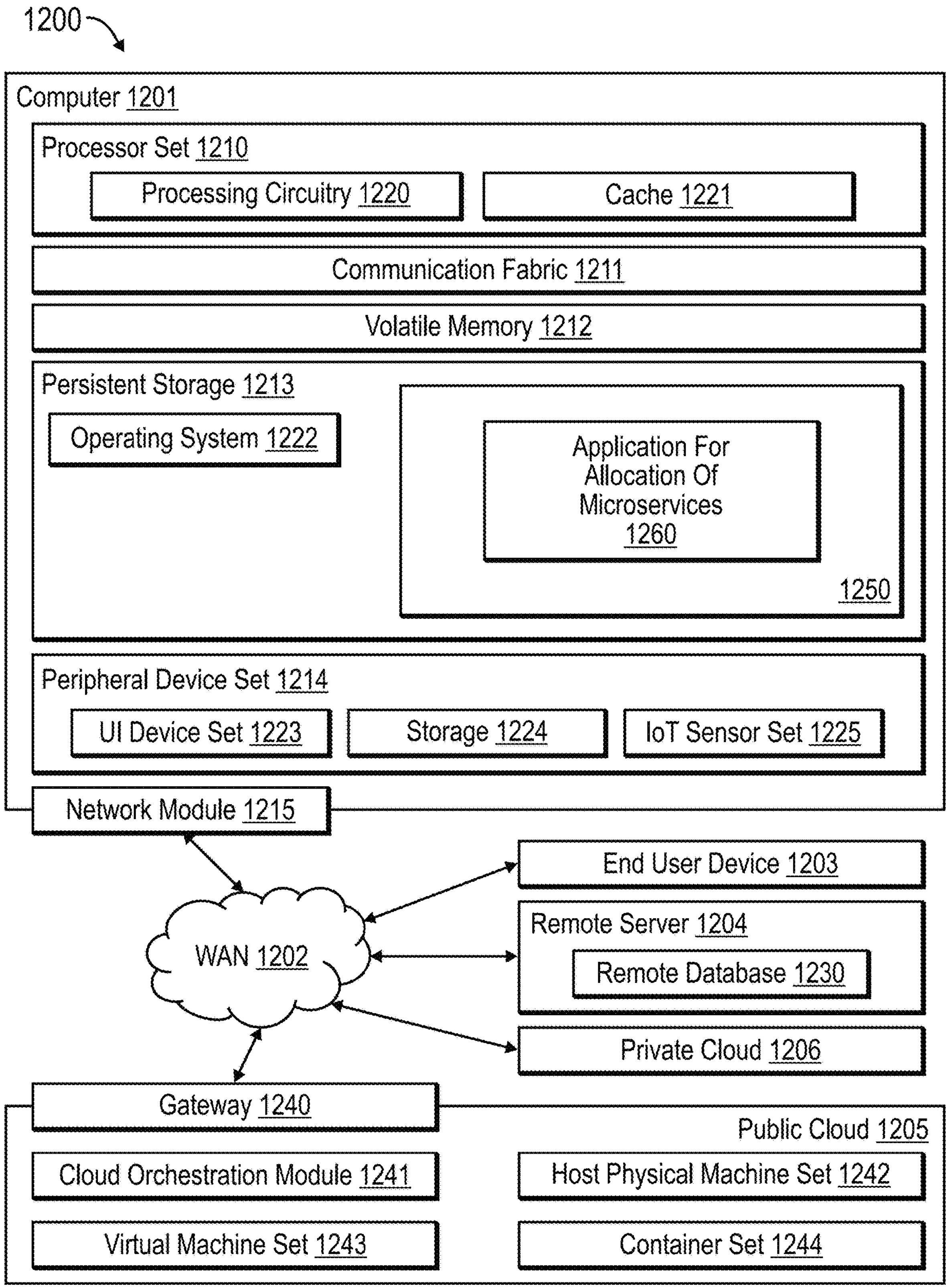
FIG. 8 illustrates a computing environment in which certain components may be implemented, in accordance with certain embodiments.

In FIG. 8, computing environment 1200 contains an example of an environment for the execution of at least some of the computer code (block 1250) involved in performing the operations of an application for allocation for microservices 1260 that performs operations shown in FIGS. 1-7.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:

providing a plurality of edge computing nodes in a multi-access edge computing environment; and performing operations to ensure that energy consumption of edge computing nodes is minimized and a latency of serving requests is lower than a threshold by:

overapproximating or underapproximating parameter bounds or budgets; and using reinforcement learning discrete actions to determine whether to overapproximate or underapproximate in an integer linear programming (ILP) solution.

2. The method of claim 1, wherein reinforcement learning continuous actions are used to determine an amount of overapproximation or underapproximation.

3. The method of claim 1, wherein a reinforcement learning agent is used to assign rewards and to assign zero rewards for infeasible solutions.

4. The method of claim 1, wherein a directed acyclic graphic is used to represent an order of invocation of microservices in a microservice-based application.

5. The method of claim 4, wherein each microservice has a latency requirement, and wherein probability distributions for microservice invocations are maintained in a matrix for performing computations, and wherein an objective function is weighted by probability of a microservice invocation.

6. The method of claim 1, wherein given a power budget and the latency, a server and dynamic voltage frequency scale (DVFS) allocation for each microservice is determined.

7. The method of claim 1, wherein the ILP is solved by relaxing to linear programming (LP).

8. A system comprising:

a memory; and a processor coupled to the memory, wherein the processor performs operations, the operations comprising:

providing a plurality of edge computing nodes in a multi-access edge computing environment; and performing operations to ensure that energy consumption of edge computing nodes is minimized and a latency of serving requests is lower than a threshold by:

overapproximating or underapproximating parameter bounds or budgets; and using reinforcement learning discrete actions to determine whether to overapproximate or underapproximate in an integer linear programming (ILP) solution.

9. The system of claim 8, wherein reinforcement learning continuous actions are used to determine an amount of overapproximation or underapproximation.

10. The system of claim 8, wherein a reinforcement learning agent is used to assign rewards and to assign zero rewards for infeasible solutions.

11. The system of claim 8, wherein a directed acyclic graphic is used to represent an order of invocation of microservices in a microservice-based application.

12. The system of claim 11, wherein each microservice has a latency requirement, and wherein probability distributions for microservice invocations are maintained in a matrix for performing computations, and wherein an objective function is weighted by probability of a microservice invocation.

13. The system of claim 8, wherein given a power budget and the latency, a server and dynamic voltage frequency scale (DVFS) allocation for each microservice is determined.

14. The system of claim 8, wherein the ILP is solved by relaxing to linear programming (LP).

15. A computer program product, the computer program product comprising a computer readable storage medium having computer readable program code embodied therewith, the computer readable program code when executed is configured to perform operations, the operations comprising:

providing a plurality of edge computing nodes in a multi-access edge computing environment; and performing operations to ensure that energy consumption of edge computing nodes is minimized and a latency of serving requests is lower than a threshold by:

overapproximating or underapproximating parameter bounds or budgets; and using reinforcement learning discrete actions to determine whether to overapproximate or underapproximate in an integer linear programming (ILP) solution.

16. The computer program product of claim 15, wherein reinforcement learning continuous actions are used to determine an amount of overapproximation or underapproximation.

17. The computer program product of claim 15, wherein a reinforcement learning agent is used to assign rewards and to assign zero rewards for infeasible solutions.

18. The computer program product of claim 15, wherein a directed acyclic graphic is used to represent an order of invocation of microservices in a microservice-based application.

19. The computer program product of claim 18, wherein each microservice has a latency requirement, and wherein probability distributions for microservice invocations are maintained in a matrix for performing computations, and wherein an objective function is weighted by probability of a microservice invocation.

20. The computer program product of claim 15, wherein given a power budget and the latency, a server and dynamic voltage frequency scale (DVFS) allocation for each microservice is determined.

* * * * *